United States Patent [19]

Pohl et al.

[11] 3,720,689

[45] March 13, 1973

[54] PROCESS FOR STABILIZING LACTONES

[75] Inventors: Gerhard Pohl, Grossauheim; Karl-Heinz Rink, Hanau (Main); Wolfgang Treibel, Grossheim; Otto Weiberg, Neu-Isenburg; Wolfgang Weigert, Offenbach (Main), all of Germany

[73] Assignee: Deutsch Gold-und Silber-Scheideanstalt Vormals Roessler, Frankfurt am Main, Germany

[22] Filed: Nov. 12, 1970

[21] Appl. No.: 89,003

[30] Foreign Application Priority Data

Nov. 12, 1969 Germany.....................P 19 56 832.2

[52] U.S. Cl....................................................260/343

[51] Int. Cl..............................................C07d 9/00
[58] Field of Search.......................................260/343

[56] References Cited

UNITED STATES PATENTS

| 3,025,306 | 3/1962 | Guest et al. | 260/343 |
| 3,278,562 | 10/1966 | Thigpen et al. | 260/343 |
| 3,564,018 | 2/1971 | Dockner et al. | 260/343 |

Primary Examiner—John M. Ford
Attorney—Michael S. Striker

[57] ABSTRACT

Lactones are stabilized, particularly against discoloration, by mixing the lactone with oxygen, an oxidizing agent or an acid which is less volatile than the lactone and subjecting the mixture to distillation.

8 Claims, No Drawings

PROCESS FOR STABILIZING LACTONES

BACKGROUND OF THE INVENTION

The invention relates to a process for stabilizing lactones, particularly ε-caprolactone, specifically against discoloration.

Lactones, particularly ε-caprolactone, when standing in air or exposed to heat take on easily a yellowish and up to reddish color. This discoloration interferes with the further processing because the reaction products of these lactones, for instance polymerization products, likewise are discolored. An important use for lactones is in the manufacture of polyester polyols as intermediates for the further processing to make polyurethanes. With these polyester polyols it is quite important that they be without any color.

It has been proposed to avoid discoloration of lactones by preventing the lactones from any contact with the oxygen of the air. The lactones, for this purpose, are stored in nitrogen and in the same manner filled into the containers in order to prevent discoloration of the reaction products (German published application 1,247,019, U.S. Pat. No. 3,227,730). The necessity to operate without access to air makes all further reactions with the lactones difficult and also has an undesirable effect on the further processing.

It has also been proposed to stabilize lactones against discoloration by addition of oxygen acceptors such as organic phosphites which may be used in mixture with sterically hindered phenols (U.S. Pat. Nos. 3,227,730; 3,274,216). The addition of these prior-art stabilizers, however, effects an adequate protection against discoloration only if the handling is likewise effected under an atmosphere of nitrogen.

It is therefore an object of the present invention to provide color-stable lactones, particularly ε-caprolactone, which even upon access of air or when exposed to heat during chemical reactions have no tendency to discoloration.

SUMMARY OF THE INVENTION

This object is accomplished by mixing the lactone with oxygen or at least one oxidizing agent or an acid which under the conditions of the operation is less volatile than the lactone and subjecting the mixture to distillation.

DETAILED DESCRIPTION OF THE INVENTION AND OF PREFERRED EMBODIMENTS

The preferred lactone is ε-caprolactone.

The lactone treated according to the process of the invention is color-fast, that is, it has no tendency to suffer or undergo discoloration under further action of the oxygen of the air and therefore does not require storing or handling upon exclusion of air. This greatly facilitates the further processing.

It was entirely unsuspected and surprising that it is not at all necessary to prevent the access of air oxygen to the lactones. The process of the invention, rather, operates in the opposite direction in that the lactones are made or maintained color-fast by the access of air thereto.

When the oxygen of the air acts on the lactone, in particular on ε-caprolactone, small amounts of the contamination which have the tendency to discoloration are converted into oxidation products which have a substantially higher boiling point than the corresponding lactone and therefore can be easily separated therefrom. The contamination otherwise could not be separated by distillation from the lactone because of closely similar boiling points.

To effect the color-stabilization of lactones, particularly ε-caprolactone, by the process of the invention, the lactone can be exposed, instead of air, also to oxygen or generally to oxygen-furnishing compounds such as inorganic or organic peroxides or persulfates. Also, mixtures of several such compounds are useful for the process of the invention.

Given the same conditions of reaction, the oxygen of oxygen-furnishing compounds is more effective than that of air oxygen. Preferred is the use of hydrogen peroxides or of derivatives thereof, and among the latter particularly the percarbamide.

Other useful oxidizing agents are for instance benzoyl peroxide, cumol hydroperoxide, barium peroxide, potassium chlorate and potassium nitrate. Also, other oxidizing agents which do not yield oxygen, such as iron--III-chloride and iodine, improve the stabilization.

The time necessary to effect complete oxidation of the discoloration-prone contamination depends on the activity of the oxidizing agent and the reaction temperature. If air oxygen is used at 20° C, several days, for instance between 2 and 5 days, are necessary. However, with the same agent at 120° C, only 1 hour is required. With the use of agents of higher activity such as hydrogen peroxide the necessary reaction time is so short that it is sufficient to simply effect the distillation of the lactone in the presence of a small amount of the oxidizing agent.

It is also possible to treat the lactone with acids instead of oxidizing agents. The acids also accomplish the conversion of the contamination which causes the discoloration to reaction products which are less volatile than the original lactone. The colorless and color-fast lactone therefore can easily be distilled off from these reaction products. If acids are used for the color-stabilization of lactones it is, however, necessary that they be non-volatile under the distillation conditions applied to the specific lactone. Otherwise, the acid will end up in the distillate and will again cause the formation of secondary contaminations which, in turn, will have a tendency for discoloration.

The reaction time and the temperature, in case of acids, are not different from those in case of the oxidizing agents. Preferred for the treatment of lactones are p-toluene sulfonic acid, naphthalene sulfonic acids, sulfuric acid or phosphoric acid. In addition, suitable are also, for instance, nitric acid, perchloric acid, benzoic acid and adipic acid. Also, acid salts such as aluminum chloride and zinc chloride effect some degree of improvement of the color stability. The treatment can also be effected with mixtures of several acids or with mixtures of oxidizing agents and acids.

The amount of oxidizing agent and/or acid which is necessary to effect the stabilization is within the range between about 0.01 and 3 percent by weight relative to the amount of lactone.

The reaction temperature for the conversion of the contaminations to reaction products of lower volatility is in the range between 0° and 250° C. The treatment is preferably effected at a pressure between 0.1 mm Hg (torr) and atmospheric pressure. However, pressures above atmospheric pressure and up to 50 atm. above atmospheric pressure may also be used.

The time of the treatment necessary to completely convert the contaminations depends on the reaction temperature and is between a few seconds and several days.

An additional step to stabilize the lactone, particularly the ε-caprolactone, is this: After the lactone has been treated with oxygen or an oxidizing agent, or acid, or a mixture of these materials and has been subjected to distillation, there is added to it a small amount, that is between about 0.01 and 1 percent by weight relative to the weight of the lactone, of an oxygen-furnishing compound. These compounds may be the same as indicated above for the main treatment. This additional stabilization further improves the protection of the already color-stable lactone, and this is important particularly if the lactone is intended to be heated for a prolonged period of time to an elevated temperature such as for instance 95° C.

The following examples will further illustrate the invention and will furnish, also, comparative tests. The measure for the coloring is APHA color number of the individual test compound. This color number is further defined in "Physical and Chemical Examination" by H. A. Gardner and G. G. Sward, 11th edition, 1950, published by H. A. Gardner Laboratory, Inc., 4723 Elm Street, Bethesda, Md., U.S.A.

EXAMPLE 1

One hundred parts by weight of caprolactone were reacted with 0.5 parts by weight of percarbamide and distilled for a period of 1 hour in a vacuum at a distillation temperature of 120° C without using any column apparatus and intermediate separation. A colorless caprolactone distillate was obtained which remained colorless even after heat treatment in an open receptacle exposed to air at 95° C for 24 hours. The APHA color number after this heat treatment was 0.

If 100 wt.-parts of caprolactone are treated under the same condition and distilled without addition of percarbamide, there is likewise obtained a colorless caprolactone distillate which, however, does not remain colorless. It undergoes discoloration to a reddish color when standing in air at room temperature during a period of 1–2 weeks. In case of heat treatment for 24 hours at 95° C, the discoloration occurs much faster.

The freshly distilled and at first colorless caprolactone, after the heat treatment, has an APHA color number of 500.

EXAMPLE 2

One hundred parts by weight of caprolactone were mixed with 1 part by weight of hydrogen peroxide (35 wt.-percent concentration) and the mixture was then distilled for ½ hour in a vacuum at a distillation temperature of 120° C without use of a distillation column. The water generated by the decomposition of the hydrogen peroxide was separated. There was obtained a colorless caprolactone distillate which remained colorless also after heat treatment in an open vessel exposed to air at 95° C for 24 hours. The APHA color number after the heat treatment still was 0. This caprolactone also remained colorless when standing in air at room temperature for periods of weeks, and this both in an open and closed receptacle.

A distillation for comparison purposes of caprolactone at the same conditions but without hydrogen peroxide resulted in an initially colorless caprolactone distillate which became discolored after heat treatment for 24 hours at 95° C and then had a reddish-yellow color and an APHA color number of 500. This caprolactone of the comparative test also became discolored at room temperature within about 1–2 weeks.

EXAMPLE 3

The following table is a compilation of 10 different tests. Test 3 is the control experiment. In that case caprolactone was not treated prior to distillation with an oxygen donor or an acid. In tests 4–12 a treatment was effected prior to the distillation (0.2 mm Hg/80° C) in order to convert the discoloration-prone contamination to reaction products of low volatility. The recorded APHA color numbers afterheat treatment of the caprolactone test compounds give after heat indication of the effectiveness of the treating agent.

| Test number | 3 | 4 | 5 | 6 | 7 | 8 | 9 | 10 | 11 | 12 |
|---|---|---|---|---|---|---|---|---|---|---|
| Caprolactone treated as follows: | | | | | | | | | | |
| No treatment, only dist. (control) | + | | | | | | | | | |
| 3 days/120° C., air introduced, then dist. | | + | | | | | | | | |
| 1 h./120° C., air introduced, then dist. | | | + | | | | | | | |
| 1 h./120° C., 1% H₂O₂ (35%), then dist. | | | | + | | | | | | |
| 1 h./120° C., 0.5% percarbamide, then dist. | | | | | + | | | | | |
| 1 h./120° C., heated with 0.1% p-toluene sulfone acid, then dist. | | | | | | + | | | | |
| 1 h./120° C., heated with 0.1 conc. HCl, then dist. | | | | | | | + | | | |
| 1 h./120° C., heated with 0.5% benzoyl peroxide, then dist. | | | | | | | | + | | |
| 1 h./120° C., heated with 0.5% barium peroxide, then dist. | | | | | | | | | + | |
| 1 h./120° C., heated with 0.5% ammonium persulfate, then dist. | | | | | | | | | | + |
| APHA number after heat treatment: | | | | | | | | | | |
| 24 h./95° C | 500 | 100 | 50 | 10 | 10 | 300 | 100 | | | |
| 72 h./95° C | 800 | | | | | | | 50 | 200 | 200 |

EXAMPLE 4

A colorless caprolactone distillate which had been treated as indicated in Test 5 of Example 3 (by introduction of air, 1 h/120° C) and which showed an APHA number of 50 after heat treatment for 24 hours at 95° C was reacted with 0.1 percent by weight relative to the caprolactone of percarbamide. After another heat treatment for 24 hours at 95° C, the discoloration did only result in an APHA number of 10.

EXAMPLE 5

A colorless caprolactone distillate was obtained by treatment as indicated in Test 8 of Example 3, that is by heating, 1h/120° C with 0.1 percent p-toluene sulfone acid. When the test compound was then heat-treated for 24 hours at 95° C, an APHA color number of 300 resulted. However, treating the same compound pretreated as in Test 8 of Example 3 thereafter with 0.1 percent of its weight of percarbamide, the supplemental stabilization in case of a similar heat treatment for 24 hours at 95° C resulted in a discoloration of an APHA number of only 75.

Without further analysis the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. A process for stabilizing a pre-made lactone against discoloration, the said process comprising reacting the lactone with an amount of about 0.01 to 3 percent by weight, relative to the lactone, of an oxidizing agent or an acid which is non-volatile under the conditions of the reaction at a temperature between 0° and 250° C or exposing the caprolactone to air or oxygen at such temperature until the impurities present in the original lactone are converted to products having higher boiling points than the lactone and thereafter subjecting the lactone to distillation to separate it from the impurities.

2. The process of claim 1 wherein the distillation is effected in the presence of the oxidizing agent.

3. The process of claim 1 wherein the reaction with the oxidizing agent is effected at a pressure between about 0.1 mm Hg and up to 50 atm above atmospheric pressure.

4. The process of claim 1, wherein the lactone is $\epsilon$-caprolactone.

5. The process of claim 1, wherein as oxidizing agent percarbamide or hydrogen peroxide are used.

6. The process of claim 1, wherein the distillation is effected at about 120° C in a vacuum.

7. The process of claim 1 wherein the obtained lactone distillate is thereafter again reacted with an oxygen-furnishing compound to further improve the color stability of the lactone.

8. The process of claim 7 wherein the oxygen-furnishing compound is employed in an amount from about 0.01 to 1 percent by weight relative to the weight of the lactone.

* * * * *